United States Patent
Kendall et al.

(10) Patent No.: US 11,754,732 B2
(45) Date of Patent: Sep. 12, 2023

(54) EARTHQUAKE DETECTION AND SHUTOFF DEVICE

(71) Applicant: eQuake Systems Inc., Calgary (CA)

(72) Inventors: Robert Kendall, Calgary (CA); Douglas Arnold Goble, Calgary (CA)

(73) Assignee: eQuake Systems Inc., Calgary (CA)

( * ) Notice: Subject to any disclaimer, the term of this patent is extended or adjusted under 35 U.S.C. 154(b) by 107 days.

(21) Appl. No.: 17/318,301

(22) Filed: May 12, 2021

(65) Prior Publication Data

US 2021/0356612 A1   Nov. 18, 2021

Related U.S. Application Data

(60) Provisional application No. 63/023,695, filed on May 12, 2020.

(51) Int. Cl.
   *G01V 1/00*   (2006.01)
   *G08B 21/10*  (2006.01)
   *G01V 1/28*   (2006.01)

(52) U.S. Cl.
   CPC .............. *G01V 1/008* (2013.01); *G01V 1/288* (2013.01); *G08B 21/10* (2013.01)

(58) Field of Classification Search
   CPC ......... G01V 1/008; G01V 1/288; G08B 21/10
   See application file for complete search history.

(56) References Cited

U.S. PATENT DOCUMENTS

| | | | |
|---|---|---|---|
| 6,722,203 B1* | 4/2004 | Evans | G01V 13/00 73/1.85 |
| 10,718,442 B1* | 7/2020 | Fatehi | F16K 17/363 |
| 2006/0081412 A1* | 4/2006 | Wright | G01V 1/40 181/104 |

* cited by examiner

*Primary Examiner* — Elias Desta
(74) *Attorney, Agent, or Firm* — Haynes and Boone, LLP (57) ABSTRACT

Disclosed herein are earthquake detection devices capable of initiating a safety response in the event of an earthquake. The earthquake detection devices comprise a plurality of three-component accelerometers for measuring acceleration in three directions; and a processing unit for: receiving acceleration measurements from each of the plurality of accelerometers, determining if the acceleration measurements meet or exceed a predetermined threshold value and sending a signal to one or more transducers.

22 Claims, 2 Drawing Sheets

EARTHQUAKE DETECTION AND SHUTOFF DEVICE

CROSS-REFERENCE TO RELATED APPLICATIONS

This application claims the benefit of U.S. Provisional Patent Application No. 63/023,695 filed May 12, 2020 which is hereby incorporated by reference in its entirety.

TECHNICAL FIELD

The present disclosure generally relates to earthquake detection devices. More specifically, the present disclosure relates to earthquake detection devices configured to initiate a safety response.

BACKGROUND

Earthquakes are generally caused by a release of energy from the Earth's lithosphere that creates seismic waves, which shake and displace or disrupt the surface of the Earth. Earthquake epicentres are usually located along tectonic plate boundaries. One of such boundaries is known as the "Pacific Ring of Fire", where more than 75% of the Earth's volcanos are located and about 90% of earthquakes occur.

At present, about 2.7 billion people live in earthquake zones around the world. While some earthquakes are weak enough that they cannot be felt, some earthquakes are strong enough to cause significant damage to or destruction of large amounts of infrastructure. Earthquakes can also cause a considerable number of fatalities. For example, the earthquake that struck Haiti on Jan. 12, 2010 caused about 316,000 fatalities, and the earthquake that struck China on May 12, 2008 caused 87,587 fatalities. In fact, the earthquake that struck Haiti was only a magnitude of 7 on the Richter scale and, in addition to the severe number of fatalities, had an economic impact of about 8 billion USD.

While the damage caused by stronger earthquakes alone can be devastating, the damage is often compounded by infrastructure, such as utility systems, that could not be rendered safe prior to or at the time of the earthquake. For example, damage to infrastructure may include damage to water or gas lines that, in turn, may cause flooding or fire. The flooding or fire may lead to additional infrastructure damage and additional fatalities.

Thus, there is a need for an earthquake detection device that is capable of initiating a safety response such as shutting off water lines, gas lines, power lines, and the like in the event of an earthquake.

SUMMARY

The present disclosure relates to earthquake detection devices that are configured to initiate one or more safety responses. The earthquake detection devices use a plurality of three-component accelerometers to determine if an earthquake is occurring and, in the event of an earthquake, the device can shut off a utility system, selectively operate equipment, issue an audible or visual warning, or a combination thereof.

The earthquake detection devices of the present disclosure that comprise the plurality of three-component accelerometers may generate accurate acceleration measurements so that an earthquake-generated acceleration event can be distinguished from other sources of vibrations. For example, by using the acceleration measurements provided by the plurality of three-component accelerometers, an earthquake can be distinguished from vibrations caused by construction, heavy vehicles (e.g. trains or transport trucks), etc. As well, the use of the plurality of three-component accelerometers allows for the generation of a plurality of acceleration measurements that may be averaged to provide a more-accurate representation of the acceleration experienced at a given location.

Further, the plurality of accelerometers may also provide the earthquake detection devices with sensor redundancy. That is, in the event that one accelerometer fails, there is at least one other accelerometer to act as a back up and continue measuring acceleration events. As a result, the earthquake detection devices may still function as intended even if an accelerometer fails.

Accordingly, in some embodiments, the present disclosure relates to an earthquake detection device comprising: a plurality of three-component accelerometers for measuring acceleration in three directions; and a processing unit for: receiving acceleration measurements from each of the plurality of accelerometers; determining if the acceleration measurements meet or exceed a predetermined threshold value; and, sending a signal to one or more transducers.

The present disclosure also provides a system for monitoring and responding to seismic activity. The system comprises a plurality of earthquake detection devices, each earthquake detection device configured as an internet of things (IoT) device. The earthquake detection devices can send location information and acceleration measurements collected at the location to, for example, a cloud-based server for further processing.

From the collected location information and acceleration measurements, the system for monitoring and responding to seismic activity is advantageously capable of determining conditions at the location where individual earthquake detection devices are installed and adjusting earthquake triggers accordingly. For example, based on the location of an earthquake detection device and the collected acceleration measurements, the structural integrity of a building in which the detection device is installed or the ground conditions at the location of the detection device can be determined. Based on such factors, the threshold that acceleration measurements must meet to trigger the detection device to shut off a utility system, selectively operate equipment, issue an audible or visual warning, etc. may be adjusted for each specific location. The collected acceleration measurements may also be subsequently used in big data analytics for teaching an artificial intelligence (AI) to autonomously adjust the predetermined thresholds of individual detection devices that are used to determine whether an earthquake is occurring.

Accordingly, in some embodiments, the present disclosure relates to a system for monitoring and responding to seismic activity, the system comprises: a plurality of earthquake detection devices, each earthquake detection device is configured as an IoT device that comprises: a plurality of three-component accelerometers for measuring acceleration in three directions; and a processing unit for: receiving acceleration measurements from each of the plurality of accelerometers, determining if the acceleration measurements meet or exceed a predetermined threshold value; and sending the acceleration measurements to a server.

Other aspects and features of the devices and systems of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

The embodiments of the present disclosure generally relate to earthquake detection devices capable of initiating one or more safety responses in the event of an earthquake, as well as systems for monitoring and responding to seismic activity.

Some embodiments of the present disclosure relate to an earthquake detection device that comprises: a plurality of three-component accelerometers for measuring acceleration in three directions; and a processing unit for: receiving acceleration measurements from each of the plurality of accelerometers, determining if the acceleration measurements meet or exceed a predetermined threshold value; and, sending a signal to one or more transducers.

As used herein, the term "three-component accelerometer" refers to an accelerometer that is capable of measuring acceleration in three directions—i.e. acceleration along an x-axis, a y-axis, and a z-axis.

As used herein, the term "processing unit" refers to an electronic circuit that performs one or more operations on a data set. Non-limiting examples of processing units include microprocessors, controllers, microcontrollers, central processing units (CPU), and the like.

As used herein, the term "transducer" refers to a component that, in general, converts one form of energy into another. One non-limiting example of a transducer is an actuator, which converts a source of energy (e.g. electrical) into mechanical motion. Non-limiting examples of actuators include solenoid valves, electric motors (e.g. rotary or linear motors), hydraulic cylinders, etc. Another non-limiting example of a transducer includes an electroacoustic transducer such as a loud speaker, or an electro-optical transducer such as a strobe light.

Embodiments of the present disclosure will now be described by reference to FIG. 1 and FIG. 2, which show representations of earthquake detection devices and systems for monitoring and responding to seismic activity according to some embodiments of the present disclosure.

Figure 1:
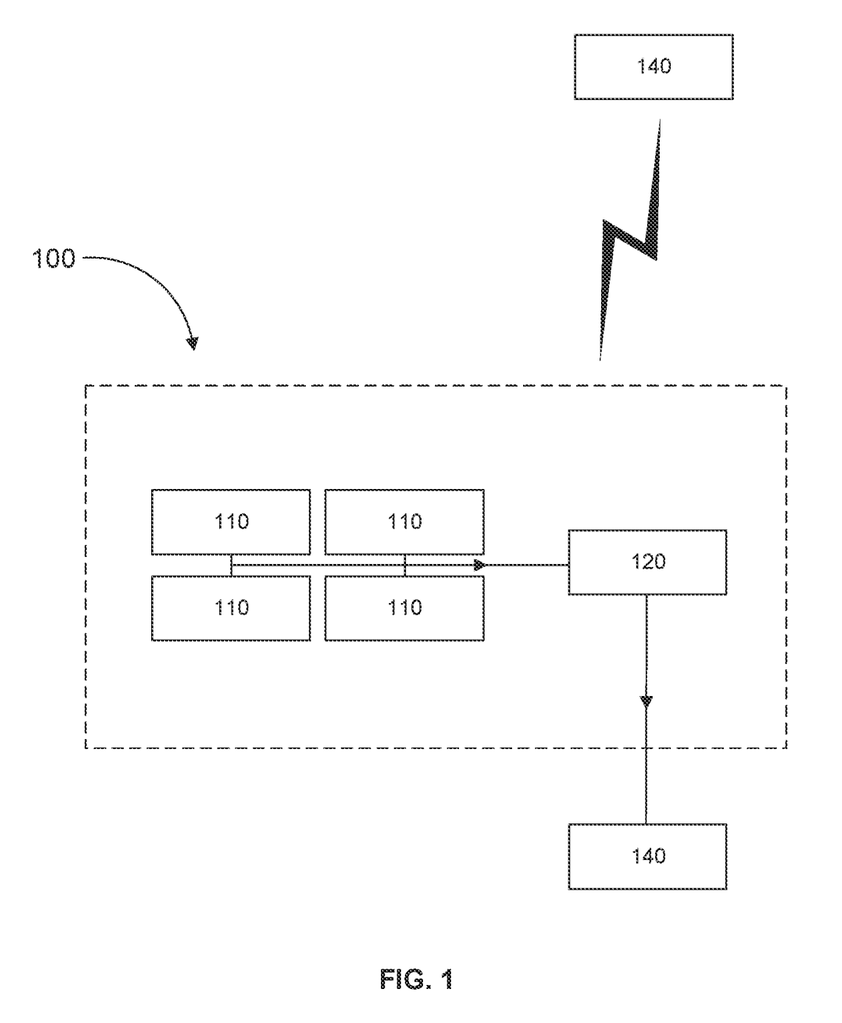
FIG. 1 shows a functional block diagram of an earthquake detection device according to an embodiment of the present disclosure.

Referring to FIG. 1, there is illustrated a functional block diagram of an earthquake detection device 100 according to an embodiment of the present disclosure. In the illustrated embodiment, the earthquake detection device 100 comprises a plurality of three-component accelerometers 110 and a processing unit 120.

The plurality of three-component accelerometers 110 may be of any suitable type. For example, the plurality of three-component accelerometers 110 may be micro-machined microelectromechanical systems (MEMS) accelerometers, piezoresistive accelerometers, piezoelectric accelerometers, or combinations thereof. The earthquake detection device 100 uses the plurality of three-component accelerometers 110 to measure acceleration caused by various sources (e.g. seismic waves or human-made waves) to determine if an earthquake is occurring. Further, the plurality of three-component accelerometers 110 may comprise be 2, 3, 4, or more three-component accelerometers. In one embodiment, the plurality of three-component accelerometers 110 comprises 3 or more three-component accelerometers. In a further embodiment, the plurality of three-component accelerometers 110 comprises 4 accelerometers.

Seismic waves include body waves and surface waves. Body waves include primary waves (p-waves) and secondary waves (s-waves). As will be appreciated by those of ordinary skill in the art, p-waves (or longitudinal waves) are characterized by alternating longitudinal compressions and rarefactions in the same direction as the p-wave is propagating. S-waves are characterized by alternating transverse motions that are perpendicular to the direction of wave propagation. Due to the anisotropy of the rock formations that form the interior of the earth, there are two distinct types of s-waves. The two types of s-waves may be characterized as a fast s-wave (S1) and a slow s-wave (S2), which are orthogonal in orientation. Both S1 and S2 waves have higher amplitudes and lower velocities p-waves. The combination of the alternating transverse (or "side-to-side") motions and the larger amplitudes of the s-waves result in them being more destructive than p-waves. For example, the alternative transverse motions of the s-waves may be amplified in taller buildings, thereby causing increased damage thereto.

P-waves and s-waves are classified as body waves, as they travel through the interior of the earth. In contrast, surface waves travel only through the crust of the earth. When measured by the plurality of three-component accelerometers, p-waves are generally characterized by particle motion (acceleration) in a vertical direction, while s-waves are generally characterized by particle motion (acceleration) in two orthogonal horizontal directions (e.g. along the x-axis and y-axis).

Surface waves have a lower frequency than body waves (i.e. p-waves and s-waves) and, in combination with s-waves, are largely responsible for the damage and destruction caused by earthquakes. There are two main types of surfaces waves. The first type are Love waves, which are characterized by transverse horizontal motion that is perpendicular to the direction of wave propagation. The second type are Rayleigh waves, which propagate along a free surface and consist of a mixture of compressional and shear energy. The particle motion of Rayleigh waves is elliptical and retrograde in the vertical plane. Both Love waves and Rayleigh waves are dispersive and, as a result, their amplitude decreases with depth.

Due to the motion of p-waves, they travel the fastest through the earth. S-waves are the second fastest, while surface waves are slower and arrive after the body waves.

Any acceleration measured by the plurality of three-component accelerometers 110 is sent to the processing unit 120 to determine if an earthquake is occurring. In more detail, the processing unit 120 compares acceleration measurements with a predetermined threshold value in order to distinguish between seismic waves and human-made waves. As will be discussed in more detail below, the predetermined value may vary based on various conditions at the location at which the detection device 100 is installed.

In order to distinguish between different types of waves (i.e. the various types of seismic waves, human-made waves, etc.), the processing unit 120, as an initial step, determines the orientation of the detection device 100. The orientation of the detection device 100 may be determined by using the plurality of three-component accelerometers 110 to determine the direction of gravity. By using the direction of gravity, the processing unit 120 can thereafter determine the local x, y, and z axes of the detection device 100, as the direction of gravity corresponds to the opposite direction of the local vertical. The initial self-orientation of the detection device 100 need only occur once (e.g. at boot-up), as the orientation data may be stored for future use.

Using the orientation data of the detection device, the processing unit 120 can distinguish between the various types of seismic waves based on the direction(s) of acceleration measured by the plurality of three-component accelerometers 110 and the characteristic motion of each of the different types of seismic waves.

In the event of a vibration felt by the detection device 100, the plurality of three-component accelerometers 110 measure the acceleration and direction(s) thereof of the vibrations and send this acceleration information to the processing unit 120. Once the acceleration measurements are received, the processing unit 120, using the orientation data determined during the initial self-orientation, determines the direction(s) of acceleration events at the location of the earthquake detection device 100. Acceleration measurements matching the characteristic motion of p-waves, s-waves, and surface waves are compared to predetermined threshold values. If acceleration measurements corresponding to p-waves, s-waves, and surface waves match or exceed the predetermined threshold values, the processing unit 120 will determine that an earthquake is occurring.

As discussed above, the various types of seismic waves travel at different speeds away from the hypocentre of an earthquake. Thus, the earthquake detection device 100 may not initially detect p-waves, s-waves, and surface waves at the same time. The time difference between detection of seismic waves may be accounted for by the processing unit 120. For example, upon detection of acceleration characteristic of a p-wave (the fastest seismic wave) that meets or exceeds a predetermined threshold, the processing unit 120 may be configured to wait an amount of time before determining that an earthquake is or is not occurring. During the amount of time, if the plurality of three-component accelerometers 110 do not detect acceleration characteristic of that of an s-wave (the second fastest seismic wave) that meets or exceeds a predetermined second threshold, the processing unit 120 will determine that an earthquake is not occurring. However, if acceleration characteristic of that of an s-wave is detected, the processing unit 120 may subsequently wait a second amount of time to determine if acceleration corresponding to a surface wave is detected. This process can continue until acceleration events that are characteristic of p-waves, s-waves, and surface waves are detected, at which point the processing unit 120 can determine that an earthquake is occurring.

However, in general, p-waves have lower amplitudes than those of s-waves and surfaces waves. As well, as previously described herein, damage resulting from earthquakes is largely caused by s-waves and surface waves. Thus, processing unit 120 of the earthquake detection device 100 may be configured to determine that an earthquake is occurring based on acceleration events that are characteristic of s-waves and surface waves.

To detect and distinguish seismic waves from each other and human-made waves (e.g. those caused by construction, vehicles, and the like), each of the plurality of three-component accelerometers 110 are used. Acceleration measurements from each of the plurality of three-component accelerometers 110 are sent to the processing unit 120. An advantage of using the acceleration measurements from each of the plurality of three-component accelerometers 110 is that the processing unit 120 can calculate and use averages of acceleration measurements to distinguish between seismic waves and human-made waves (typically impulsive noise sources such as operating heavy machinery, large vehicles or striking the processing unit 120) and to determine with greater accuracy if an earthquake is occurring rather than falsely determining that an earthquake is occurring when such acceleration events are actually caused by human-made waves. That is, the processing unit 120 may be configured to calculate the average acceleration in each direction that acceleration is measured. For example, if acceleration is measured along the x- and y-axes by each of the plurality of three-component accelerometers 110, the processing unit 120 may calculate the average acceleration along the x-axis and the average acceleration along the y-axis and use the calculated averages to determine if an earthquake is occurring. Using the average directional acceleration measurements may provide a more accurate representation of the vibrations at the location of the earthquake detection device 100 and thus may more accurately distinguish between seismic waves and human-made waves, as well as between types of seismic waves.

Further, using acceleration measurements from each of the plurality of three-component accelerometers 110, the processing unit 120 can calculate the vector sum of acceleration experienced by the detection device 100. That is, the processing unit 120 can calculate the sum of the squares of the acceleration measurements in a given direction and take the square root of the sum to provide an accurate representation of the acceleration measured in that direction. For example, if the plurality of three-component accelerometers 110 measure acceleration along a given axis (e.g. x-, y-, or z-axis), the processing unit 120 can then square each of the measurements generated by the plurality of three-component accelerometers 110, calculate the sum of the squares, and take the square root of the sum of the squares to provide an accurate representation of acceleration along the axis. Alternatively, the vector sum may be expressed as a single, combined vector that represents the true combined acceleration experienced by the detection device 100. Calculating the vector sum may be particularly useful when the source of an acceleration event is proximal the plurality of three-component accelerometers 110 (e.g. when the detection device 100 is proximal the hypocentre of an earthquake), as acceleration may be accurately measured in different directions and distinguished from each other. As well, calculating the vector sum may also allow the detection device 100 to determine that an earthquake is occurring independent of the direction of an acceleration event, which may allow the detection device 100 to be installed at any orientation, as previously described herein.

In some embodiments, prior to using the acceleration measurements to calculate the vector sum thereof, the processing unit 120 may perform digital signal processing (DSP) on the acceleration measurements generated by the plurality of three-component accelerometers 110 to prepare the measurements for subsequent processing. For example, the processing unit 120 may apply a finite impulse response (FIR) filter to the acceleration measurements. The FIR filter may reduce the amplitude of the acceleration measurements as the frequency of the acceleration measurements increases as well as constrain the frequencies of the acceleration measurements to a selected range. The FIR filter may be, for example, a 35 tap FIR filter. In some embodiments, the FIR filter may constrain the frequency range of the acceleration measurements to between about 1 Hz and about 10 Hz, while reducing the amplitude of the acceleration measurements to about 80% at 1 Hz and to about 20% at 10 Hz. The features of the FIR filter may be selected based on known industry standards. For example, the FIR filter may be configured to filter the acceleration measurements such that the filtered measurements fit between the upper and lower curves of the gas ball actuation requirements according the ASME A17.1-2016 standard, which is commonly used for earthquake monitoring. The filtered measurements may then be used to calculate the vector sum of the acceleration event, as described above.

As an acceleration event continues, multiple acceleration measurements will be generated by the plurality of three-component accelerometers 110 over the course of the acceleration event, which the processing unit 120 will use to calculate multiple vector sums. In some embodiments, the processing unit 120 may calculate a running average (or "moving mean") using at least some of the calculated vector sums to produce a smoothed vector sum that may then be compared to the predetermined threshold. In more detail, the smoothed vector sum may be calculated using the vector sums determined from the acceleration measurements generated by the plurality of three-component accelerometers 110 over a selected period of time. Using a smoothed vector sum may reduce the impact of extreme anomalous variations in the acceleration measurements to thereby provide a more accurate representation of the acceleration event so that a safety response may be correctly initiated, if need be.

The smoothed vector sum may be calculated using the vector sums of acceleration measurements measured over a period of about 1 second to about 5 seconds. In some embodiments, the smoothed vector sum may be calculated using the vector sums of acceleration measurements measured over the previous 2 seconds of the acceleration event. Further, once calculated, the smoothed vector sum may be scaled for comparison with industrial standards. For example, the smoothed vector sum may be scaled to fit within the upper and lower curves of the gas ball actuation requirements according the ASME A17.1-2016 standard.

Once the processing unit 120 processes the acceleration measurements, the processing unit 120 may then compare the acceleration measurements to the predetermined threshold to determine if an earthquake is occurring.

In some embodiments, the predetermined threshold may be a specific amount of acceleration, a specific amplitude of acceleration measurements, a specific frequency of the acceleration measurements, or a combination thereof that must be met or exceeded for the processing unit 120 to initiate a safety response. In such embodiments, the predetermined threshold may be a minimum amount of acceleration expressed as a percentage of gravity. For example, the processing unit 120 may be configured to determine that an earthquake is occurring if the plurality of three-component accelerometers 110 generate acceleration measurements that exceed a limit in the range of about 0.5 g to about 0.15 g. As will be discussed below, the predetermined threshold can be adjusted to take into account factors such as the structural integrity of a structure in which the detection device 100 is installed and/or the ground conditions at the location of installation.

In some embodiments, the predetermined threshold comprises a frequency response curve produced by collecting acceleration measurements generated by the plurality of three-component accelerometers 110 under normal conditions (i.e. acceleration measurements generated from sources other than earthquakes). In such embodiments, after production of the frequency response curve, acceleration measurements generated by the plurality of three-component accelerometers 110 can be continuously compared to the reference curve in order to determine if a measured acceleration event is an event that is expected under normal conditions (i.e. falls along or within the curve) or if the acceleration event is an event that is not expected under normal conditions (i.e. does not fall along or within the curve), such as an earthquake.

In some embodiments, the processing unit 120 may determine that an earthquake is occurring if the acceleration measurements generated by the plurality of three-component accelerometers 110 exceed the predetermined threshold for a selected period of time. For example, the processing unit 120 may be configured to determine that an earthquake is occurring if the acceleration measurements exceed the predetermined threshold for about 1 second to about 5 seconds. In some embodiments, the processing unit 120 may be configured to determine that an earthquake is occurring if the acceleration measurements exceed the predetermined threshold for about 2.5 seconds. Such embodiments may be useful for avoiding potential false positives caused by human-made waves.

Once the processing unit 120 determines that an earthquake may be occurring, it sends a signal to one or more transducers 130. The signal sent by the processing unit 120, may also be referred to as a command and a command signal. The signal will cause all or some of the one or more transducers 130 to activate or deactivate, as the case may be. When activated, the one or more transducers 130 are configured to implement one or more safety measures to mitigate secondary damage caused by the earthquake. As used herein, the expression "secondary damage" refers to damage caused indirectly by an earthquake, rather than damage caused directly by an earthquake (e.g. structural damage caused by the shaking of the earth). Examples of secondary damage include flooding caused damaged pipes and fires caused by ruptured gas lines.

In some embodiments of the present disclosure the one or more transducers 130 comprise a converting transducer that is configured to convert the electrical signal received from the processing unit 120 to a mechanical, auditory, and/or visual response. For example, the one or more transducers 130 may include an electroacoustic transducer such as a loudspeaker, an electro-optical transducer such as a light emitting diode (LED), or any combination thereof. In some embodiments of the present disclosure, the one or more transducers 130 comprise an actuator such as a solenoid valve, an electric motor, a hydraulic cylinder, other types of actuators or any combination thereof. In some embodiments of the present disclosure the one or more transducers 130 comprise one or more converting transducers or one or more actuators or any combinations thereof.

The processing unit 120 may send a signal to the one or more transducers 130 via any suitable method. For example, the processing unit 120 may be connected to the one or more transducers 130 via a hardwired connection or a wireless communication technology such as, but not limited to: radio frequency identification; cellular including 3G, 4G, 5G; Wi-Fi, Bluetooth™, Bluetooth low energy, a local area network including ZigBee, Z-Wave, 6LoWPAN, near field communication, SigFox and the like. In such configurations, the one or more transducers 130 may comprise a wireless receiver (not shown). As well, or alternatively, the one or more transducers 130 may be hardwired to the processing unit 120. It will be appreciated that, in embodiments where a plurality of actuators 130 are in communication with the processing unit 120, a combination of hardwiring and wireless technologies may be used.

The one or more transducers 130 may be a pre-installed transducer—i.e. one that has been installed prior to installation of the detection device 100 and for a purpose other than for use with the detection device 100. As a non-limiting example, the detection device 100 can be installed at a location and hardwired to an electrical switch so that the detection device 100 can cut the power at the location in the event of an earthquake. The one or more transducers 130 may also be installed specifically for use with the detection device 100. In one example, the one or more transducers 130 comprises a solenoid valve that is operatively coupled with a fluid supply/egress line (e.g. a gas line). Actuating the solenoid valve can open and close the line, thereby stopping or permitting a flow of fluid through the fluid supply/egress line beyond the solenoid valve.

Further, the one or more transducers 130 may be directly or indirectly in communication with the processing unit 120. For example, the processing unit 120 may be in communication with a control system preinstalled at a location such that, in the event that an earthquake is detected, the processing unit 120 sends a signal to the control system (e.g. a software-based control system), which, in turn, sends a signal to the one or more transducers 130. Alternatively or in combination with indirect communication protocols, the processing unit 120 may directly communicate with the transducer 130, for example by hardwiring or by wireless technologies.

As discussed above, the processing unit 120 is configured to compare the acceleration measurements, average directional acceleration measurements, and/or vector sum of acceleration measurements to a predetermined threshold value to determine if an earthquake is occurring. However, in some embodiments, the processing unit 120 may be configured to compare each of the acceleration measurements, average directional acceleration measurements, and/or vector sum of acceleration measurements to a plurality of predetermined threshold values. In such embodiments, the processing unit 120 may be configured to compare the acceleration measurements to a low threshold value and to a high threshold value. If only the low threshold is met or exceeded, the earthquake may be relatively weak and thus may not warrant, for example, cutting the power to a building. Thus, if only the low threshold is met or exceeded, the processing unit 120 may be configured to send a signal to the one or more transducers 130 to initiate a warning response (e.g. sounding an alarm) while, in the event that both the low and high threshold are met, the processing unit 120 may be configured send a signal to the one or more transducers 130 to initiate a more-serious safety response (e.g. cutting the power and water at building). In embodiments where the predetermined threshold is a specific amount of acceleration, the low threshold may be set at, for example, about 0.05 g to about 0.09 g, while the high threshold may be set at about 0.10 g to about 0.15 g.

The use of a low threshold and high threshold may be useful for detecting foreshocks (i.e. a less-powerful seismic event occurring before a full-strength earthquake) and issuing a warning that an earthquake may occur soon thereafter. For example, in operation, the foreshocks may meet or exceed the low threshold but not the high threshold, and the processing unit 120 may then send a signal to the one or more transducers 130 in order to issue a warning response indicating that an earthquake may soon follow.

Thus, the detection device 100, by way of the one or more transducers 130, is capable of implementing safety measures such as shutting off fluid supply lines (e.g. water lines, gas lines, etc.), ceasing the operation of mechanical equipment (e.g. bringing elevators to a stop, opening the doors thereof, and parking weights), shutting off power at a location, triggering the shut down of industrial operations, producing an audible alarm, producing a visual alarm (e.g. strobe light), etc. Many applications are possible and are contemplated.

According to a further embodiment, the processing unit 120 is configured to send (by wired or wireless technology) the acceleration measurements detected by the plurality of three-component accelerometers 110 to a server 140. In some embodiments of the present disclosure, the server 140 may be a cloud-based server that receives the acceleration measurements from the processing unit 120 by wireless technology. The server 140 may store the collected acceleration measurements and/or may be configured for further processing the acceleration measurements. For example, the server 140 may be configured to analyze (e.g. by way of software installed thereon) the acceleration measurements to determine various factors about the location at which the detection device 100 is installed.

Using the acceleration measurements, the server 140 may determine the structural integrity of a building in which the detection device 100 is installed and the ground conditions at the location of the detection device 100. Based on such factors, the server 140 may determine an appropriate threshold value that acceleration measured by the plurality of three-component accelerometers 110 must meet in order to trigger the processing unit 120 to send a signal to the one or more transducers 130. That is, different buildings in the same location, or similar buildings in different locations may have different thresholds for triggering the processing unit 120 to send a signal to the one or more transducers 130.

The processing unit 120 may connect to the server 140 using a variety of methods. In one embodiment, the processing unit 120 sends the acceleration measurements to the server 140 via a Modbus communication protocol. The Modbus communication protocol may advantageously render the detection device 100 difficult to access by unauthorized users, thereby providing enhanced security. The Modbus communication protocol may be over a transmission control protocol (TCP) Ethernet connection, Internet protocol (IP) Ethernet connection, or over a RS232 serial connection. Thus, the detection device 100 may comprise an Ethernet port and/or an RS232 port. In some embodiments, the detection device comprises an Ethernet port and an RS232 port in order to provide redundant connections to the server 140.

Further, in some embodiments, the detection device 100 is configured as an internet of things (IoT) device. In such embodiments, the detection device 100 may be configured to communicate with other earthquake detection devices, including further detection devices 100, and/or with a device such as a smartphone, personal computer, etc. to thereby operate as a seismic array. In more detail, connection to other earthquake detection devices may be used to inform the detection device 100 about acceleration measured at another location. For example, a first earthquake detection device is located at a first location and a second earthquake detection device is located at a second location. If acceleration events occur at the first location and these events are indicative of an earthquake, as determined by the first earthquake detection device, the processing unit 120 of the first earthquake detection device may send a signal to the one or more transducers 130 of the second earthquake device. This inter-device communication can occur even if the plurality of three-component accelerometers 110 of the second earthquake device have not yet measured acceleration events that are indicative of the earthquake determined to be occurring at the first location.

Further, the connection to smartphones and/or personal computers allows an authorized user to control the detection device 100. For example, the user can initiate the sending of the signal to the one or more transducers 130 (e.g. to shutdown or restart utilities controlled by the one or more transducers 130), monitor the health of the detection device 100, check the power status of the detection device 100 (e.g. the connection to a power source and/or the battery level), view event logs, adjust the predetermined threshold, etc. In some embodiments, the user may control or monitor the detection device 100 using an application such as a web-based application, a smartphone application, or a combination thereof.

The detection device 100 may comprise one or more additional components. In some embodiments of the present disclosure, the detection device 100 further comprises a backup power source, such as an electrical connection to backup generators or a rechargeable backup battery, for providing power in the event that a main power source (e.g. electrical grid) can no longer supply power to the detection device 100 (e.g. in the event of a power outage). The rechargeable battery may be a rechargeable 12V battery.

In a further embodiment, the detection device 100 further comprises a universal serial bus (USB) port. The USB port may comprise a USB type A port, a USB type B port, a USB type C port, a micro-USB port, a mini-USB port, or a combination thereof. The USB port may be used for connection to external storage (e.g. an external hard drive or flash drive), a power source (e.g. the rechargeable battery), etc.

In a yet further embodiment, the detection device 100 further comprises a Secure Digital (SD) card slot. The SD card slot may be a standard SD card slot, a mini-SD card slot, or a micro-SD card slot. The SD card slot receives an SD card that may contain firmware or software for the operating of the processing unit 120, data generated by the plurality of three-component accelerometers 110, the processing unit 120, or a combination thereof. Data generated by the plurality of three-component accelerometers 110 and/or the processing unit 120 may be formatted as a CSV file format, a miniSEED file format, a SEED file format, a SAC file format, the like, and combinations thereof.

In some embodiments, the detection device 100 comprises one or more LEDs for indicating that the detection device 100 is operational, that the detection device 100 experienced a fault, that the detection device 100 is powered, or other operational conditions of the detection device 100.

In some embodiments, the detection device 100 comprises one or more buttons for unlocking, initiating, suspending, or resetting operation of the device. Further, the detection device 100 may comprise an unlock button for decreasing the potential of unintentional use of other buttons. In operation, other buttons will be prevented from functioning unless the unlock button is pressed previously thereto or simultaneously therewith, thereby lowering the possibility of, for example, unintentionally suspending or resetting operation of the detection device 100.

Further, the detection device 100 may comprise a bypass button for providing a bypass function that temporarily suspended operation of the device. The bypass button may be used as an extra precaution, for example, during construction (e.g. blasting) on the structure in which the detection device 100 is installed to temporarily suspend operation of the detection device 100.

Further, the detection device 100 may comprise a trip-test button for initiating a warning response and/or safety response when pressed. When the trip-test button is released, the detection device returns to normal operation. The trip-test may be used to test that the detection device 100 is working as intended. The inclusion of the trip-test button may afford a number of benefits, as conventional testing techniques involve causing a device to initiate a warning and/or safety response by, for example, producing vibrations with a hammer.

In a further embodiment, the detection device 100 comprises one or more additional positional sensors. The positional sensors may include gyroscopes, magnetometers, and the like. The one or more additional positional sensors may be used in the determination of the orientation of the detection device 100 and/or the determination of whether an earthquake is occurring.

In a further embodiment, the detection device 100 comprises one or more additional hazard sensors such as floor water sensors and gas sensors (e.g. a carbon monoxide sensor). In such embodiments, the processing unit 120 may be configured for to send a signal to the one or more transducers 130 in the event that the one or more additional hazard sensors are tripped. For example, if a carbon monoxide sensor is tripped, the processing unit 100 may send a signal to the one or more transducers 130 in order to sound an alarm or shut off gas.

In a further embodiment, the detection device 100 comprises a real time clock. The real time clock may be used to monitor the time over which an acceleration event occurs. The real time clock may also provide the time to the processing unit 120 to be used to calculate, for example, the running average of the vector sums, as previously described herein. The real time clock may be any suitable clock such as a DS3231 RTC.

The various components of the detection device 100 may be mounted on a hardware board. The hardware board may be any suitable board such as an A20-SOM-EVB or equivalent microcontroller. As well, the board may be mounted in a suitable container case (e.g. a plastic case). In some embodiments, the container case may have a NEMA-4 rating.

The present disclosure also relates to a system for monitoring and responding to seismic activity. In one embodiment, a system of the present disclosure comprises a plurality of earthquake detection devices, each earthquake detection device configured as an internet of things (IoT) device and comprising: a plurality of three-component accelerometers for measuring acceleration events in three directions; and a processing unit for: receiving acceleration measurements from each of the plurality of accelerometers, determining if the acceleration measurements meet or exceed a predetermined threshold value; and sending the acceleration measurements to a server.

Figure 2:
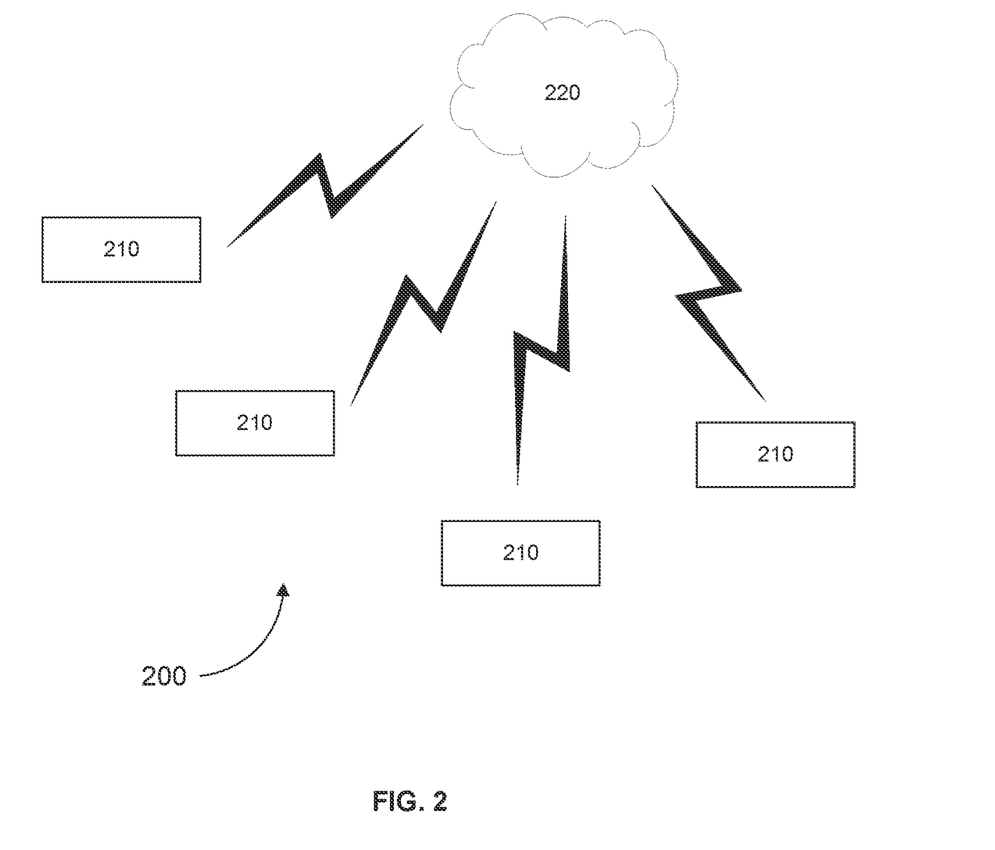
FIG. 2 shows a functional block diagram of a system for monitoring and responding to seismic activity according to an embodiment of the present disclosure.

A system 200 according to one embodiment of the present disclosure is illustrated in FIG. 2. The system 200 comprises a plurality of earthquake detection devices 210, each of which is configured to communicate with other earthquake detection devices and with a server 220 (i.e. an IoT device). The plurality of detection devices 210 may be configured in the same manner as described above in relation to the detection device 100.

The server 220 may be configured as described above in relation to server 140. In the illustrated embodiment, the server 220 is a cloud-based server. The server 220 collects acceleration measurements measured by the plurality of detection devices 210 for further processing. Using the acceleration measurements, 210, the server 220 can implement structural health monitoring, whereby the structural integrity of a building that an earthquake detection device is installed can be determined. That is, the server 220 can implement structural health monitoring (SHM), which generally involves collecting acceleration measurements generated by the plurality of three-component accelerometers of an individual earthquake detection device during an earthquake to generate a frequency response curve. When the frequency response curve is generated by an earthquake, it is then compared to a previously-generated frequency response curve to determine if the frequency response of the structure in which the earthquake detection device is installed changed as a result of the earthquake. If the frequency response of the structure changed, the structural health of the structure may need to be inspected.

Further, the server 220 may also be configured to determine the ground conditions at the location of an earthquake detection device using the collected acceleration measurements. Determination of the ground conditions may be accomplished in the same manner as described above in relation to the SHM. That is, the ground conditions may be determined by way of a frequency response curve produced by collected acceleration measurements generated by an earthquake detection device.

The structural integrity of the building and/or the ground conditions at the location of the building can be used to determine the threshold that needs to be met in order for an individual earthquake detection device to initiate a response. For example, a modern earthquake-resistant building may have a different threshold to trigger a response by an earthquake detection device than an older building located proximal thereto. As well, two equally earthquake-resistant buildings built at locations with different ground conditions may also have different thresholds.

For example, an earthquake detection device may be installed in a structure and configured to have a predetermined threshold of 0.10 g. However, if after a period of time, a frequency response curve is generated that indicates that the structure may not be structurally sound, the predetermined threshold may be adjusted to a lower value such as 0.05 g.

Thus, the system 200 can be pre-set with threshold values that are based on the specific structures and/or ground conditions at the locations were each of the plurality of detection devices 210 are installed. This allows for the determination of the minimum amount of seismic waves that a location can withstand before a safety response should be initiated.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially" of or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The invention claimed is:

1. An earthquake detection device comprising:
    a plurality of three-component accelerometers for measuring acceleration in three directions; and
    a processing unit that is configured for:
    receiving acceleration measurements in a first direction, a second direction, and a third direction from each of the plurality of accelerometers;
    determining average acceleration measurements for the first direction, the second direction, and the third direction using the acceleration measurements received from each of the plurality of accelerometers;
    determining if the average acceleration measurements for the first direction, the second direction and the third direction meet or exceed predetermined threshold values; and,
    sending a signal to one or more transducers.

2. The earthquake detection device of claim 1, wherein the plurality of accelerometers comprises three or more accelerometers.

3. The earthquake detection device of claim 2, wherein the plurality of accelerometers comprises four accelerometers.

4. The earthquake detection device of claim 1, wherein the processing unit is configured for:
    determining a vector sum of the acceleration measurements from each of the plurality of accelerometers; and,
    determining if the vector sum of the acceleration measurements meet or exceed a predetermined threshold value.

5. The earthquake detection device of claim 1, wherein the processing unit is configured for:
    determining a plurality of vector sums of acceleration measurements from each of the plurality of accelerometers over a selected period of time;
    determining a running average of the plurality of vector sums; and, determining if the running average of the vector sums of the acceleration measurements meet or exceed a predetermined threshold value.

6. The earthquake detection device of claim 5, wherein the processing unit is configured to apply a finite impulse response (FIR) filter to the acceleration measurements from each of the plurality of accelerometers.

7. The earthquake detection device of claim 1, wherein the one or more transducers comprise a solenoid valve.

8. The earthquake detection device of claim 7, wherein the solenoid valve is positioned along a fluid supply/egress line, wherein actuating the solenoid valve stops or permits a flow of fluid through the fluid supply/egress line.

9. The earthquake detection device of claim 1, wherein the processing unit is for sending the acceleration measurements from each of the plurality of accelerometers to a cloud-based server.

10. The earthquake detection device of claim 9, wherein the acceleration measurements are sent to the cloud-based server via a Modbus communication protocol.

11. The earthquake detection device of claim 10, wherein the Modbus communication protocol is over a transmission control protocol (TCP) Ethernet, Internet protocol (IP) Ethernet, or over a RS232 serial connection.

12. The earthquake detection device of claim 1, wherein the device is configured as an internet of things (IoT) device.

13. The earthquake detection device of claim 1, further comprising a floor water sensor and/or a gas sensor.

14. The earthquake detection device of claim 13, wherein the gas sensor is a carbon monoxide sensor.

15. The earthquake detection device of claim 1, further comprising a real time clock (RTC) for providing the time to the processing unit.

16. The earthquake detection device of claim 1, wherein the predetermined threshold is an amount of acceleration in the range of about 0.05 g to about 0.15 g.

17. The earthquake detection device of claim 1, wherein the predetermined threshold comprises a low threshold and a high threshold.

18. The earthquake detection device of claim 17, wherein the low threshold is an amount of acceleration in the range of about about 0.05 g to about 0.09 g and the high threshold is an amount of acceleration in the range of about 1.0 g to about 0.15 g.

19. A system for monitoring and responding to seismic activity, the system comprising:
a plurality of earthquake detection devices, each earthquake detection device configured as an internet of things (IoT) device and comprising:
a plurality of three-component accelerometers for measuring acceleration in three directions; and
a processing unit for:
receiving acceleration measurements in a first direction, a second direction, and a third direction from each of the plurality of accelerometers,
determining average acceleration measurements for the first direction, the second direction, and the third direction using the acceleration measurements received from each of the plurality of accelerometers;
determining if the average acceleration measurements for the first direction, the second direction, and the third direction meet or exceed predetermined threshold values; and
sending the acceleration measurements to a server.

20. The system of claim 19, wherein the processing units of each of the plurality of earthquake detection devices are configured to send the acceleration measurements to the same server.

21. The system of claim 19, wherein the server is accessible by way of a web-based application, a smartphone application, or a combination thereof.

22. The system of claim 21, wherein the server is accessible by a user to control the processing unit of one or more of the earthquake detection devices, monitor the health of the one or more earthquake detection devices, check the power status of the one or more earthquake detection devices, view an event log, adjust the predetermined threshold of at least one of the earthquake detection devices, or any combination thereof.

* * * * *